(12) United States Patent
Sano et al.

(10) Patent No.: US 7,006,507 B2
(45) Date of Patent: *Feb. 28, 2006

(54) DIGITAL HOME INFORMATION INTEGRATING SYSTEM

(75) Inventors: Reiji Sano, Kawasaki (JP); Yoshitomi Nagaoka, Osaka (JP); Masashi Kanno, Osaka (JP); Yoshiaki Kushiki, Osaka (JP); Nobuhisa Ito, Ootsu (JP); Tsutomu Asabe, Osaka (JP); Terumasa Yamamoto, Osaka (JP); Masaaki Kobayashi, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 463 days.

This patent is subject to a terminal disclaimer.

(21) Appl. No.: 10/137,359

(22) Filed: May 3, 2002

(65) Prior Publication Data

US 2002/0121964 A1    Sep. 5, 2002

Related U.S. Application Data

(63) Continuation of application No. 08/956,586, filed on Oct. 23, 1997, now Pat. No. 6,661,798.

(30) Foreign Application Priority Data

Oct. 23, 1996  (JP)  .................................. 8-299767

(51) Int. Cl.
*H04J 12/28*    (2006.01)
(52) U.S. Cl. .................................... 370/400
(58) Field of Classification Search ................ 370/400, 370/465, 466, 467, 468, 401, 311, 254, 252, 370/241, 351, 352, 403
See application file for complete search history.

(56) References Cited

U.S. PATENT DOCUMENTS

| | | | | |
|---|---|---|---|---|
| 4,754,426 A | * | 6/1988 | Rast et al. | 725/120 |
| 5,684,450 A | * | 11/1997 | Brown | 340/310.02 |
| 5,740,231 A | | 4/1998 | Cohn et al. | 370/401 X |
| 5,905,882 A | * | 5/1999 | Sakagami et al. | 700/86 |
| 6,005,861 A | | 12/1999 | Humpleman | 370/466 X |

(Continued)

FOREIGN PATENT DOCUMENTS

JP    58-203592    11/1983

(Continued)

*Primary Examiner*—Dang Ton
(74) *Attorney, Agent, or Firm*—Clark & Brody

(57) ABSTRACT

A large volume of digital media home information output from each of audio, visual, computer and communication (AVCC) apparatuses is transmitted to a digital media home information network at a high data speed and is received by one AVCC apparatus. Also, a small volume of digital environment home information output from each of self-management apparatuses such as an energy sensor, a security sensor and a health care sensor is transmitted to a digital environment home information network at a low data speed and is received by a digital information transmitting/receiving and protocol converting unit. In this unit, a protocol of the digital environment home information in the digital environment home information network is converted into that in the digital media home information network, and the data speed of the digital environment home information in the digital environment home information network is changed to that in the digital media home information network. Thereafter, the digital environment home information is received and processed by one of the AVCC apparatuses. Therefore, because both the networks are integrated by the converting unit, the digital media home information and the digital environment home information can be used at user's home at a low cost.

12 Claims, 2 Drawing Sheets

U.S. PATENT DOCUMENTS 6,661,798 B1 * 12/2003 Sano et al. ................ 370/400

FOREIGN PATENT DOCUMENTS

| JP | 62-076343 | 4/1987 |
| JP | 62-219824 | 9/1987 |
| JP | 04-167639 | 6/1992 |
| JP | 07-095243 | 4/1995 |

* cited by examiner

FIG. 2

| NETWORK | SYSTEM | DATA TRANSMITTING/RECEIVING SPEED (bps) |
|---|---|---|
| DIGITAL MEDIA HOME INFORMATION NETWORK | TELEPHONE COMMUNICATION SYSTEM 12 | AROUND 144 Kbps |
| | DIGITAL AVC SYSTEM 13 | 30~60 Mbps |
| | PERSONAL COMPUTER SYSTEM 14 | SEVERAL TENS Mbps |
| DIGITAL ENVIRONMENT HOME INFORMATION NETWORK | ENERGY INFORMATION DETECTING SYSTEM 17 | FROM HUNDREDS TO THOUSANDS bps (TENS Kbps IF REQUIRED) |
| | SECURITY INFORMATION DETECTING SYSTEM 18 | |
| | HEALTH CARE INFORMATION DETECTING SYSTEM 19 | |
| | CONTROL SYSTEM 20 | |

DIGITAL HOME INFORMATION INTEGRATING SYSTEM

This application is a continuation of application Ser. No 08/956,586 filed on Oct. 23, 1997, now U.S. Pat. No. 6,661,798 issued on Dec. 9, 2003.

BACKGROUND OF THE INVENTION

1. Field of the Invention

The present invention relates to a digital home information integrating system in which various audio, visual, computer and communication (AVCC) apparatuses and various living environment electronics apparatuses arranged at user's home are cooperated to establish a home network system and digital media home information processed in the AVCC apparatuses and digital environment home information processed in the living environment electronics apparatuses are integrated in the home network system.

2. Description of the Related Art

Recently, a user has used a personal computer at his home to make good use of his experience in a local area network (LAN) and an internet operated for business in his office, so that the user can receive not only self-management information but also services of various external information such as an electronic mail.

Also, because various digital information apparatuses such as a digital video camera (DVC), STB and a digital video disk (DVD) used for picture information, audio information and/or character information and various digital information-communication apparatuses such as a portable telephone have been widely used, the user can receive or transmit various information from/to various media at his home. Information processed in the digital information apparatuses and the digital information-communication apparatuses is called digital media home information, and the digital media home information is processed in various digital audio, visual, computer and communication (AVCC) apparatuses.

In addition, it is desired to prepare a social infrastructure. For example, it is argued how an automatic meter-reading system for automatically checking the consumption of electricity at user's home, the consumption of gas at user's home and the consumption of water at user's home and an overall security system for detecting crime-prevention information, gas-leaking information, fire occurrence information for each home are prepared as the social infrastructure. Also, because the number of aged persons living alone is increased and the requirement of in-home care for the aged persons is increased, an in-home care system for each aged person has been required as another social infrastructure.

Information processed in the social infrastructure is called digital environment home information, and the digital environment home information is processed in various living environment electronics apparatuses.

2.1. Previously Proposed Art:

The digital media home information is processed for each home according to Institute of Electrical and Electronics Engineers (IEEE) Standards.

Also, because a data receiving/transmitting speed for the digital environment home information is low and a data volume of the digital environment home information is small, it has been argued that the digital environment home information is processed according to a spectrum diffusion method in a home bus system using an electric power line. In cases where the digital environment home information is processed according to the spectrum diffusion method in the home bus system, because an electric power line is arranged in user's house regardless of whether the house is planned to be newly-built or the house has been already built, it is not required to newly arrange the electric power line in the user's house.

2.2. Problems to be Solved by the Invention:

However, in cases where the digital media home information and the digital environment home information are integrated and processed at use's home, there are following drawbacks.

In cases where the digital media home information is processed for each home according to the IEEE Standards, it is also required to process the digital environment home information according to the IEEE Standards. That is, to operate the automatic meter-reading system for automatically checking the consumption of electricity at user's home, the consumption of gas at user's home and the consumption of water at user's home and the overall security system for detecting crime-prevention information, gas-leaking information, fire occurrence information for each home, it is required to arrange a digital environment home information network operated according to the IEEE Standards at all rooms of user's house. Therefore, the user requires a large amount of capital investment. In particular, in cases where a user's house has been already built, it is at variance with the reality to newly arrange the digital environment home information network in the user's house. Also, because a data receiving/transmitting speed and a data volume for the digital environment home information differ from those for the digital media home information, it is difficult to connect the living environment electronics apparatuses used for the digital environment home information with the AVCC apparatuses used for the digital environment home information.

Also, in cases where the digital environment home information is processed according to the spectrum diffusion method in the home bus system, it is required to process the digital media home information according to the spectrum diffusion method in the home bus system. However, because a data receiving/transmitting speed for the digital media home information is high and a data volume of the digital media home information is large, it is difficult to process the digital media home information according to the spectrum diffusion method in the home bus system.

SUMMARY OF THE INVENTION

An object of the present invention is to provide, with due consideration to the drawbacks of such a conventional digital home information integrating system, a digital home information integrating system in which a network for the digital media home information having a high data receiving/transmitting speed and a large volume of data and a network for the digital environment home information having a low data receiving/transmitting speed and a small volume of data are integrated and processed at a low cost.

The object is achieved by the provision of a digital home information integrating system comprising:

a first digital home information outputting apparatus for outputting first digital home information having a large volume of data at a high data transmitting speed;

a first digital home information network for receiving the first digital home information output from the first digital home information outputting apparatus and transmitting the first digital home information at the high data transmitting speed;

a second digital home information outputting apparatus for outputting second digital home information having a small volume of data at a low data transmitting speed;

a second digital home information network for receiving the second digital home information output from the second digital home information outputting apparatus and transmitting the second digital home information at the low data transmitting speed;

digital home information integrating means for connecting the first digital home information network and the second digital home information network to receive the second digital home information transmitting through the second digital home information network and transmit the second digital home information to the first digital home information network; and a first digital home information receiving apparatus for receiving the first digital home information transmitting through the first digital home information network at a high data receiving speed and receiving the second digital home information transmitting through the digital home information integrating means and the first digital home information network at the high data receiving speed.

In the above configuration, when a first operation is performed, a large volume of first digital home information output from the first digital home information outputting apparatus is transmitted to the first digital home information network at a high data transmitting speed and is received by the first digital home information receiving apparatus at a high data receiving speed.

Also, when a second operation is performed, a small volume of second digital home information output from the second digital home information outputting apparatus is transmitted to the second digital home information network at a low data transmitting speed and is transmitted to the first digital home information network at a high data transmitting speed through the digital home information integrating means. Thereafter, the second digital home information is received by the first digital home information receiving apparatus at a high data receiving speed.

Accordingly, because the first digital home information network, in which the first digital home information is transmitted, and the second digital home information network, in which the second digital home information is transmitted, are integrated by the digital home information integrating means, the user can use both the first digital home information and the second digital home information at his home.

It is preferred that the high data transmitting speed of the first digital home information outputting apparatus and the high data receiving speed of the first digital home information receiving apparatus are equal to or more than $10^5$ bits per second, and the low data transmitting speed of the second digital home information outputting apparatus is less than $10^4$ bits per second.

In cases where an audio, visual, computer or communication apparatus for outputting and receiving digital picture information, digital audio information or digital character information is arranged at user's home, the audio, visual, computer or communication apparatus is connected with the first digital home information network because a data transmitting/receiving speed of the audio, visual, computer or communication apparatus is usually equal to or more than $10^5$ bits per second. Also, in cases where a self-management apparatus such as an energy detecting apparatus, a security information detecting apparatus, a health care information detecting apparatus or a control apparatus is arranged at user's home, the self-management apparatus is connected with the second digital home information network because a data transmitting/receiving speed of the self-management apparatus is usually less than $10^4$ bits per second. Therefore, each of various apparatuses arranged at user's home can be connected with either the first digital home information network or the second digital home information network.

Also, it is preferred that a plurality of first digital home information outputting apparatuses are connected with the first digital home information network to respectively output first digital home information having a large volume of data to the first digital home information network at a high data transmitting speed, a plurality of second digital home information outputting apparatuses are connected with the second digital home information network to respectively output second digital home information having a small volume of data to the second digital home information network at a low data transmitting speed, and an average of the high data transmitting speeds of the first digital home information outputting apparatuses is 100 or more times an average of the low data transmitting speeds of the second digital home information outputting apparatuses.

In this case, even though the first and second digital home information networks are arranged at user's home, the first digital home information and the second digital home information can be economically processed at user's home.

Also, it is preferred that the second digital home information network is formed of a home wireless system, an infrared light system or an electric power line system.

In this case, because the second digital home information network is arranged at user's home at low cost, the digital home information integrating system can be obtained at low cost.

BRIEF DESCRIPTION OF THE DRAWINGS

The objects, features and advantages of the present invention will be apparent from the following description taken in conjunction with the accompanying drawings, in which:

FIG. 2 shows a data transmitting/receiving speed in each system connected with a digital media home information network or a digital environment home information network shown in FIG. 1.

DETAILED DESCRIPTION OF THE EMBODIMENTS

Figure 1:
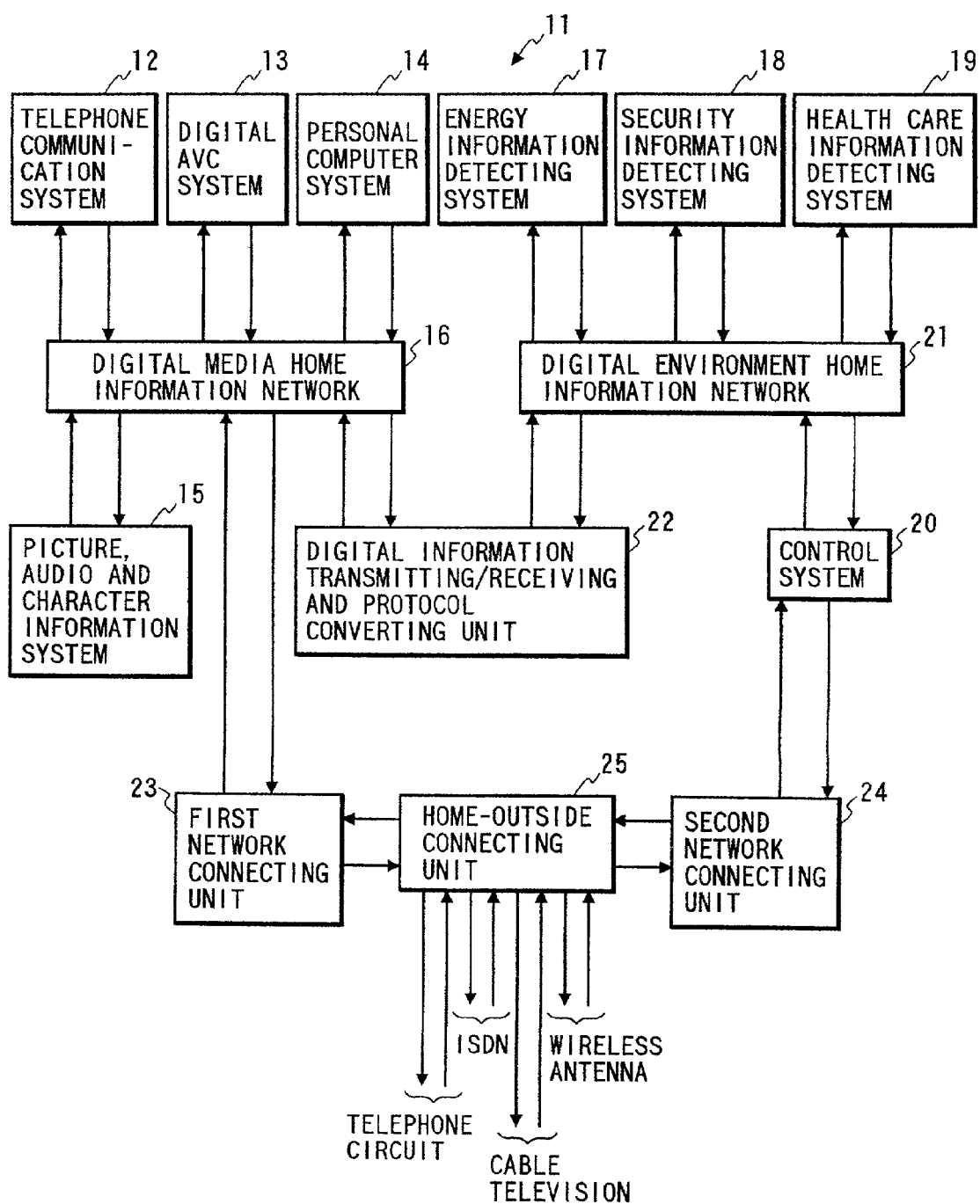
FIG. 1 is a block diagram of a digital home information integrating system according to an embodiment of the present invention.

Preferred embodiments of a digital home information integrating system according to the present invention are described with reference to drawings.

FIG. 1 is a block diagram of a digital home information integrating system according to an embodiment of the present invention.

As shown in FIG. 1, a digital home information integrating system 11 comprises a telephone communication system 12 arranged at user's home for outputting digital communication home information having a large volume of data at a high data transmitting/receiving speed according to a user's instruction as digital media home information, outputting a detecting instruction or a control instruction having a small volume of data at a high data transmitting speed according to another user's instruction and receiving another piece of digital media home information at the high data transmitting/receiving speed, a digital audio and visual computer (AVC) system 13 arranged at user's home for outputting digital audio and visual home information having a large volume of data at a high data transmitting/receiving speed according to a user's instruction as digital media home information, outputting a detecting instruction or a control instruction having a low volume of data at a high data transmitting/receiving speed according to another user's instruction and receiving and processing another piece of digital media home information output from another system, a personal computer system 14 arranged at user's home for outputting digital computer home information having a large volume of data at a high data transmitting/receiving speed according to a user's instruction as digital media home information, outputting a detecting instruction or a control instruction having a low volume of data at a high data transmitting/receiving speed according to another user's instruction and receiving and processing another piece of digital media home information output from another system, a picture, audio and character information system 15 arranged at user's home for outputting digital picture, audio and character home information having a large volume of data at a high data transmitting/receiving speed according to a user's instruction as digital media home information, outputting a detecting instruction or a control instruction having a low volume of data at a high data transmitting/receiving speed according to another user's instruction and receiving and processing another piece of digital media home information output from another system, and a digital media home information network 16 arranged at user's home for receiving and transmitting the digital media home information output from the systems 12 to 15 at the high data transmitting/receiving speeds and receiving and transmitting the detecting instruction or the control instruction output from one of the systems 12 to 15 at the high data transmitting/receiving speed.

The digital media home information network 16 functions as a first digital information communication network and is operated according to the 1394 Standard of IEEE, Standards of Ethernet and/or Standards of Integrated Services Digital Network (ISDN). A controller (not shown) is arranged in the network 16 to control the transmission of the digital media home information, if necessary.

The telephone communication system 12 is composed of communication apparatuses such as a telephone, a facsimile and the like. The digital AVC system 13 is composed of audio and visual apparatuses such as a television, a digital video disk, a digital video camera, a game machine, a picture editing apparatus and the like. The personal computer system 14 is composed of apparatuses such as a personal computer, a printer, a scanner, a digital camera and the like. The picture, audio and character information system 15 is composed of apparatuses processing other picture information, other audio information and other character information. The apparatuses of the systems 12 to 15 are classified as a first group of apparatuses processing the digital media home information.

The digital home information integrating system 11 further comprises an energy information detecting system 17 arranged at user's home for receiving the detecting instruction output from one of the systems 12 to 15 and outputting digital energy home information having a low volume of data at a low data transmitting/receiving speed as digital environment home information in response to the detecting instruction, a security information detecting system 18 arranged at user's home for receiving the detecting instruction output from one of the systems 12 to 15 and outputting digital security home information having a low volume of data at a low data transmitting/receiving speed as digital environment home information in response to the detecting instruction, a health care information detecting system 19 arranged at user's home for receiving the detecting instruction output from one of the systems 12 to 15 and outputting digital health care home information having a low volume of data at a low data transmitting/receiving speed as digital environment home information in response to the detecting instruction, a control system 20 arranged at user's home for receiving the control instruction output from one of the systems 12 to 15, controlling a control apparatus of the control system 20 according to the control instruction and outputting a control result having a low volume of data at a low data transmitting/receiving speed as digital environment home information in response to the control instruction, and a digital environment home information network 21 arranged at user's home for receiving and transmitting the digital environment home information output from the systems 17 to 20 at the low data transmitting/receiving speeds, receiving and transmitting the detecting instruction or the control instruction output from one of the systems 12 to 15 at the low data transmitting/receiving speed and receiving and transmitting the digital environment home information output from one of the systems 17 to 20.

The digital environment home information network 21 functions as a second digital information communication network and is formed of a home wireless system of about 400 MHz, an infrared light system and/or an electric power line system. A controller (not shown) is arranged in the network 21 to control the transmission of the digital environment home information, if necessary.

The energy information detecting system 17 is composed of detecting apparatuses such as a sensor for detecting the consumption of electricity, a sensor for detecting the consumption of gas, a sensor for detecting the consumption of water and the like. The security information detecting system 18 is composed of detecting apparatuses such as a sensor for detecting crime-prevention information, a sensor for detecting gas-leaking information, a sensor for detecting fire occurrence information and the like. The health care information detecting system 19 is composed of detecting apparatuses such as a bed sensor for periodically detecting health conditions (for example, a temperature, a heart rate and a blood pressure) of a bedridden old person, an old person detecting sensor for detecting a position of an old person of dementia and the like. The control system 20 is composed of control apparatuses such as a lighting apparatus, an air conditioning apparatus, a ventilating system, a bath system and the like. Each control apparatus can be easily operated by controlling an on/off switch. Therefore, self-management information is processed in the apparatuses of the systems 17 to 20, and the apparatuses of the systems 17 to 20 are classified as a second group of apparatuses processing the digital environment home information.

The digital home information integrating system 11 further comprises a digital information transmitting/receiving and protocol converting unit 22 for receiving the detecting instruction or the control instruction from the digital media home information network 16 as digital information, changing a data transmitting/receiving speed of the detecting instruction or the control instruction to a low data transmitting/receiving speed, converting a protocol of the detecting instruction or the control instruction in the network 16 into that in the digital environment home information network 21, transmitting the detecting instruction or the control instruction to the digital environment home information network 21, receiving the digital environment home information from the digital environment home information network 21, changing a data transmitting/receiving speed of the digital environment home information to a high data transmitting/receiving speed, converting a protocol of the digital environment home information in the digital environment home information network 21 into that in the digital media home information network 16 and transmitting the digital environment home information to the digital media home information network 16 to send the digital environment home information to one of the systems 12 to 15, a first network connecting unit 23 for transmitting the digital media home information of the digital media home information network 16 to the outside and receiving digital information transmitted from the outside to transmit the digital information to the digital media home information network 16 as digital media home information, a second network connecting unit 24 for receiving a detecting instruction or a control instruction transmitted from the outside and transmitting the digital environment home information of the digital environment home information network 21 to the outside in response to the detecting instruction or the control instruction, and a home-outside connecting unit 25 for connecting each of the network connecting units 23 and 24 with the outside.

The digital information transmitting/receiving and protocol converting unit 22 is formed of a gateway. The first network connecting unit 23 is formed of an internet modem, a cable modem or STB. The second network connecting unit 24 is formed of a remote computer or a simplified terminal, in which a wireless communication, a radio wave communication or an infrared light communication is used, or an interface unit of an electric power line in which the spectrum diffusion method is used.

The home-outside connecting unit 25 is formed of many circuits respectively connected with a wireless antenna used for a digital satellite communication, a digital satellite broadcasting or a digital satellite broadcasting using a digital ground wave, an optical fiber representatively used for a cable television or a telephone circuit representatively used for ISDN. For example, a circuit for digital information received or transmitted from/to the wireless antenna is connected with the digital media home information network 16 through the first network connecting unit 23, a circuit for digital information received or transmitted from/to the optical fiber connection unit is connected with the digital media home information network 16 through the first network connecting unit 23, a circuit for digital information received or transmitted from/to the telephone circuit connection unit is connected with the digital media home information network 16 through the first network connecting unit 23, and a circuit for digital information received or transmitted from/to the telephone circuit connection unit is connected with the digital environment home information network 21 through the first network connecting unit 24.

In the above configuration, an operation of the digital home information integrating system 11 is described.

An operation not using the digital information transmitting/receiving and protocol converting unit 22 is initially described.

When a user operates the telephone communication system 12, the AVC system 13, the personal computer system 14 or the picture, audio and character information system 15, digital media home information representing digital communication home information, digital audio and visual home information, digital computer home information or digital picture, audio and character home information having a large volume of data is output from one of the systems 12 to 15. This digital media home information is transmitted through the digital media home information network 16 at a high data transmitting/receiving speed. Thereafter, the digital media home information is received by one of the systems 12 to 15 or is output to the outside through the first network connecting unit 23 and the home-outside connecting unit 25. In this case, because each of the systems 12 to 15 can process information having a wide band and a large data volume at a high data transmitting/receiving speed, the systems 12 to 15 have the same data processing characteristic. Therefore, various pieces of information transmitting though the digital media home information network 16 can have the same protocol as digital media home information, and the transmission and reception of the digital media home information among the systems 12 to 15 through the digital media home information network 16 can be performed.

Also, digital environment home information representing digital energy home information, digital security home information, digital health care home information and digital control home information having a low volume of data is periodically output from the energy information detecting system 17, the security information detecting system 18, the health care information detecting system 19 and the control system 20 and is transmitted though the digital environment home information network 21 at a low data transmitting/receiving speed. Thereafter, the digital environment home information is recorded in a recording unit (not shown) arranged at user's house or is output to the outside through the second network connecting unit 24 and the home-outside connecting unit 25. In this case, because each of the systems 17 to 20 can process information having a narrow band and a small data volume at a low data transmitting/receiving speed, the systems 17 to 20 have the same data processing characteristic. Therefore, various pieces of information transmitting though the digital environment home information network 21 can have the same protocol as digital environment home information, and the digital environment home information output from the systems 17 to 20 can be transmitted through the digital environment home information network 21.

Also, when digital information having a large volume of data is, for example, output from a telephone or a personal computer placed on the outside and is transmitted to the home-outside connecting unit 25 through a telephone circuit or an internet, the digital information is transferred to the digital media home information network 16 through the first network connecting unit 23, and one of the apparatuses of the systems 12 to 15 is operated according to the digital information.

Also, when a detecting instruction or a control instruction having a small volume of data is, for example, output from a telephone placed on the outside and is transmitted to the home-outside connecting unit 25 through a telephone circuit, the detecting instruction or the control instruction is transferred to the digital environment home information network 21 through the second network connecting unit 24 and is transferred to one of the systems 17 to 20. Thereafter, digital environment home information is output from the corresponding system to the digital environment home information network 21 in response to the detecting instruction or the control instruction, and the digital environment home information is transmitted to the outside through the second network connecting unit 24 and the home-outside connecting unit 25. Therefore, the consumption of energy, gas and water indicated by the digital environment home information can be checked from the outside for each house.

Next, an operation using the digital information transmitting/receiving and protocol converting unit 22 is described.

In cases where a user desires to obtain digital energy home information, digital security home information or digital health care home information, the user inputs a detecting instruction having a low volume of data to one of the apparatuses of the systems 12 to 15, and the detecting instruction is transmitted through the digital media home information network 16 at a high data transmitting/receiving speed and is transferred to the digital information transmitting/receiving and protocol converting unit 22. In the unit 22, a data speed of the detecting instruction is changed to a low data transmitting/receiving speed, and a protocol of the detecting instruction in the network 16 is converted into that in the digital environment home information network 21. Thereafter, the detecting instruction is transmitted through the network 21 and is transferred to one of the systems 17 to 20, and digital environment home information representing digital energy home information, digital security home information or digital health care home information is output from the corresponding system and is transmitted to the digital environment home information network 21. Thereafter, the digital environment home information passes through the network 21 at a low data transmitting/receiving speed and is transferred to the digital information transmitting/receiving and protocol converting unit 22. In the unit 22, a data speed of the digital environment home information is changed to a high data transmitting/receiving speed, and a protocol of the digital environment home information is converted into that in the digital media home information network 16. Thereafter, the digital environment home information is transmitted through the network 16 and is transferred to one of the systems 12 to 15. For example, when the user operating a personal computer of the personal computer system 14 inputs an electricity consumption detecting instruction, digital energy home information indicating the consumption of electricity in his house is transmitted from the energy information detecting system 17 to the personal computer system 14, and the consumption of electricity is displayed on a display of the personal computer.

Therefore, the digital media home information having a large volume of data at a high data transmitting/receiving speed and the digital environment home information having a small volume of data at a low data transmitting/receiving speed are integrated in the digital home information integrating system 11, and the user can obtain the digital energy home information, the digital security home information or the digital health care home information.

Also, in cases where a user desires to control a control apparatus of the control system 20, the user inputs a control instruction having a low volume of data to one of the apparatuses of the systems 12 to 15. Thereafter, the control instruction is transmitted and processed in the same manner as the detecting instruction and is received by the control system 20. Thereafter, the control apparatus such as a lighting apparatus is set to a "on" or "off" condition according to the control instruction, and digital environment home information indicating the condition of the control apparatus is transmitted from the control system 20 to one of the apparatuses of the systems 12 to 15 in the same manner as the case of the detecting instruction. Therefore, the user can control the control system 20 connected with the digital environment home information network 21 through the digital media home information network 16.

Accordingly, because the digital information transmitting/receiving and protocol converting unit 22 connects the digital media home information network 16, in which digital media home information having a large volume of data is transmitted at a high data transmitting/receiving speed, and the digital environment home information network 21, in which digital environment home information having a small volume of data is transmitted at a low data transmitting/receiving speed, both the digital media home information and the digital environment home information can be utilized at user's home.

Also, because the digital environment home information network 21 is formed of a home wireless system, an infrared light system and/or an electric power line system, even though user's house has been already built, the digital environment home information network 21 can be arranged at user's home at a low cost. Therefore, the digital home information integrating system 11 can be obtained at a low cost.

Also, because the network connecting units 23 and 24 and the home-outside connecting unit 25 are arranged in the digital home information integrating system 11, the systems 12 to 15 and the outside can be communicated with each other through the digital media home information network 16, and the systems 17 to 20 and the outside can be communicated with each other through the digital environment home information network 21.

In this embodiment, when the detecting instruction or the control instruction is transmitted to the digital information transmitting/receiving and protocol converting unit 22, the unit 22 is actuated, and the detecting instruction or the control instruction is processed in the unit 22. However, in cases where the detecting instruction or the control instruction is often transmitted to the unit 22, it is applicable that the unit 22 be always actuated to immediately process the detecting instruction or the control instruction.

Also, it is applicable that the digital environment home information network 21 is formed of a pair of lines or a coaxial cable.

Next, a data transmitting/receiving speed in each of the systems 12, 13, 14, 17, 18, 19 and 20 is described.

FIG. 2 shows a data transmitting/receiving speed in each system connected with the digital media home information network 16 or the digital environment home information network 21.

As shown in FIG. 2, a data transmitting/receiving speed in each of the systems 12, 13 and 14 connected with the digital media home information network 16 is equal to or more than $10^5$ bits per second (bps), and a data transmitting/receiving speed in each of the systems 17, 18, 19 and 20 connected with the digital environment home information network 21 is less than $10^4$ bps, i.e., 10 kbps. However, this data transmitting/receiving speed may be as high as tens of kbps, if required. Therefore, an appropriate data transmitting/receiving speed in an arbitrary system connected with the digital media home information network 16 is equal to or more than $10^5$ bps, and an appropriate data transmitting/receiving speed in an arbitrary system connected with the digital environment home information network 21 is less than $10^4$ bps. Also, a system, in which a data transmitting/receiving speed ranges from $10^4$ bps to the order of $10^5$ bps, is connected with the digital media home information network 16 or the digital environment home information network 21.

In general, in cases where economical conditions are considered for the digital home information integrating system 11, it is preferred that an average value of data transmitting/receiving speeds in a plurality of apparatuses connected with the digital media home information network 16 be 100 or more times an average value of data transmitting/receiving speeds in a plurality of apparatuses connected with the digital environment home information network 21.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A digital home information integrating system comprising:
    a first digital information network coupled to a first group of apparatuses;
    a second digital information network coupled to a second group of apparatuses;
    integrating and converting means coupled to the first and second digital information networks for transmitting and receiving digital information between the first and second digital information networks; and
    home-to-outside connecting means;
    wherein said second digital information network comprises at least an electric power line system; and
    wherein the first digital information network is coupled to the home-to-outside connecting means through first network connecting means and the second digital information network is coupled to the home-to-outside connecting means through second network connecting means; and
    wherein digital information received by or transmitted from the second digital information network comprises sensor detected information and information other than the sensor detected information,
    the sensor detected information including power consumption information; and
    wherein said digital information received by or transmitted from the second digital information network is subjected to protocol conversion and data speed conversion; and
    wherein digital information received by or transmitted from the electric power line system is modulated in a spread spectrum system.

2. A digital home information integrating system according to claim 1, in which the first group of apparatuses transmits and/or receives high speed and/or large capacity digital information.

3. A digital home information integrating system according to claim 1, in which the first group of apparatuses operates for manipulating digital information of picture and/or audio and/or characters.

4. A digital home information integrating system according to claim 2, in which the first group of apparatuses operates for manipulating digital information of picture and/or audio and/or characters.

5. A digital home information integrating system according to claim 1, in which the second group of apparatuses comprises at least one of a sensor for detecting consumption of electricity at a user's home, a sensor for detecting consumption of gas at the user's home, a sensor for detecting consumption of water at the user's home, a sensor for detecting illegal entry at the user's home, a sensor for detecting gas-leakage at the user's home, and a sensor for detecting fire-occurrence at the user's home.

6. A digital home information integrating system according to claim 2, in which the second group of apparatuses comprises at least one of a sensor for detecting consumption of electricity at a user's home, a sensor for detecting consumption of gas at the user's home, a sensor for detecting consumption of water at the user's home, a sensor for detecting illegal entry at the user's home, a sensor for detecting gas-leakage at the user's home, and a sensor for detecting fire-occurrence at the user's home.

7. A digital home information integrating system according to claim 1, in which the integrating and converting means converts at least one of a protocol, a data transmitting speed and a data receiving speed between the first and second digital information networks and/or between the first and second groups of apparatuses.

8. A digital home information integrating system according to claim 2, in which the integrating and converting means converts at least one of a protocol, a data transmitting speed and a data receiving speed between the first and second digital information networks and/or between the first and second groups of apparatuses.

9. A digital home information integrating system according to claim 1, in which the second digital information network communicates via one of a home wireless system and an infrared light system.

10. A digital home information integrating system according to claim 2, in which the second digital information network communicates via one of a home wireless system and an infrared light system.

11. A digital home information integrating system according to claim 1, in which the second group of apparatuses comprises at least one sensor in a user's home, for detecting at least one of consumption of electricity, consumption of gas, consumption of water, home security information, gas-leakage, and fire-occurrence.

12. A digital home information integrating system according to claim 2, in which the second group of apparatuses comprises at least one sensor in a user's home, for detecting at least one of consumption of electricity, consumption of gas, consumption of water, home security information, gas-leakage, and fire-occurrence.

* * * * *